Figure 1:
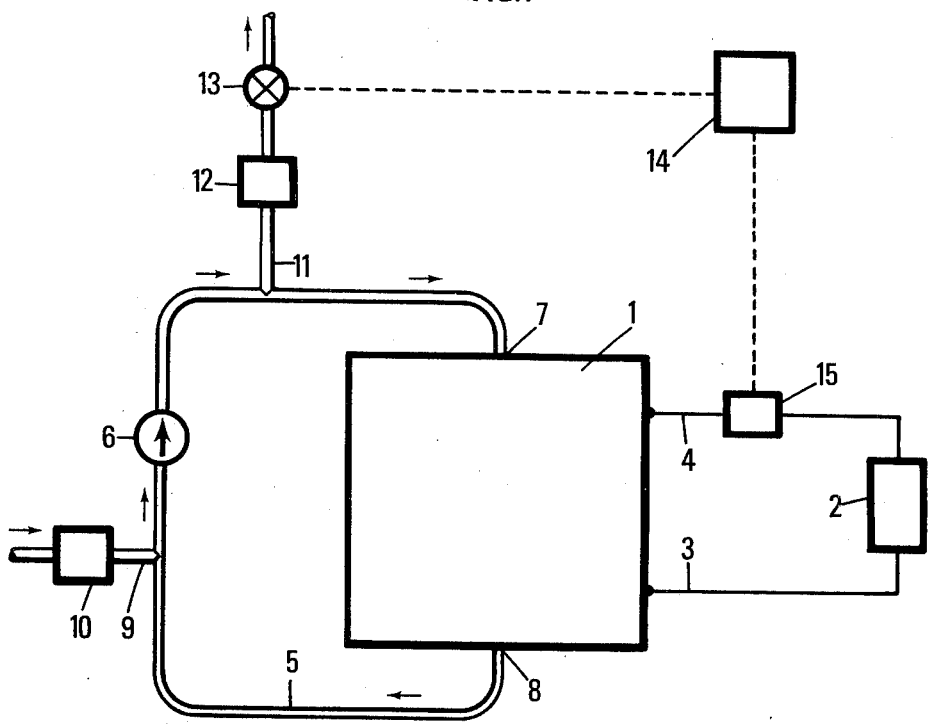

United States Patent [19]
Grehier

[11] 4,075,396
[45] Feb. 21, 1978

[54] METHOD AND DEVICE FOR FEEDING A FUEL CELL WITH A FLUID REACTANT

[75] Inventor: Alain Grehier, Paris, France

[73] Assignee: Institut Francais du Petrole, France

[21] Appl. No.: 721,217

[22] Filed: Sept. 8, 1976

[30] Foreign Application Priority Data

Sept. 17, 1975 France .................... 75 28900

[51] Int. Cl.² .............................. H01M 8/04
[52] U.S. Cl. ............................. 429/17; 429/25
[58] Field of Search ............. 429/17, 22, 23, 25

[56] References Cited

U.S. PATENT DOCUMENTS

| | | | |
|---|---|---|---|
| 3,317,348 | 5/1967 | Winsel | 429/23 |
| 3,576,677 | 4/1971 | Keating et al. | 429/23 |
| 3,580,741 | 5/1971 | Hovrous et al. | 429/23 |
| 3,697,325 | 10/1972 | Baude | 429/23 |

Primary Examiner—John H. Mack
Assistant Examiner—H. A. Feeley
Attorney, Agent, or Firm—Craig & Antonelli

[57] ABSTRACT

The fluid reactant is circulated through a close loop in which is introduced additional fresh fluid under a substantially constant pressure. A fraction of the fluid flow is discharged from the loop during a first period at a substantially constant flow rate, this fluid discharge being discontinued during a second period, said periods repeatedly following one another.

26 Claims, 8 Drawing Figures

METHOD AND DEVICE FOR FEEDING A FUEL CELL WITH A FLUID REACTANT

The present invention relates to a method of feeding a fuel cell with a fluid reactant, such as, for example, but not exclusively, hydrogen ($H_2$), and to a device for carrying out this method.

It is already known to feed a fuel cell by circulating at least one of the fluid reactants thereof through a closed loop including the fuel cell. An additional amount of fresh fluid reactant is introduced into this loop and simultaneously a fraction of the fluid effluent of this cell is discharged from the loop, in a continuous manner, in response to the variations of a parameter which is related to the electric power supplied by the fuel cell.

The fluid reactants of the fuel cell contain more or less substantial amounts of products which are not consumed in the electrochemical reaction developed at the contact of the electrodes of the fuel cell. These non-reacting products, which are referred to as impurities in the following description, are generally fluid products which gather in close vicinity to the electrodes and are detrimental to a good operation of the fuel cell. Since the quantity of the consumed reactants depends on the intensity of the electric current delivered by the fuel cell, it can be ascertained that the increase in the concentration of impurities in the feed loop is proportional to the electric power supplied by the fuel cell.

In order to prevent this increase in the content of impurities in the feed loop, the instantaneous value of the fluid flow discharged from this feed loop is controlled in response to the electric power supplied by the fuel cell.

It is thus possible to maintain in the feed loop a substantially constant proportion of impurities which is substantially independent from the electric power delivered by the fuel cell.

Prior art devices make use of elements adapted to accurately control the instantaneous flow rates of fluid reactants supplied to and discharged from the fuel cell. These elements are relatively complex and require a maintenance which is binding on the user. Moreover the quantity of fresh fluid to introduce into the feed loop is still too large as compared to the consumption of fluid reactant in the fuel cell, particularly when the latter supplies a small electric power.

An object of the present invention is accordingly to provide a method and a device for feeding a fuel cell with a fluid reactant whereby the above-indicated drawbacks are either substantially obviated, or at least considerably reduced.

The method according to the invention, to feed a fuel cell with a fluid reactant, comprises circulating this fluid through a closed loop including the fuel cell, introducing additional fresh fluid reactant under a constant pressure and discharging fluid at a constant flow rate during predetermined periods in response to the variations of a parameter depending on the operation of the fuel cell.

By this method the impurities in the feed loop of the fuel cell can be maintained at a very low level. Moreover the flow rates of the discharged fluid are very small, resulting in a minimum consumption of fresh fluid reactant.

The device for carrying out this method comprises only simple and tough elements requiring little maintenance.

Figure 2:
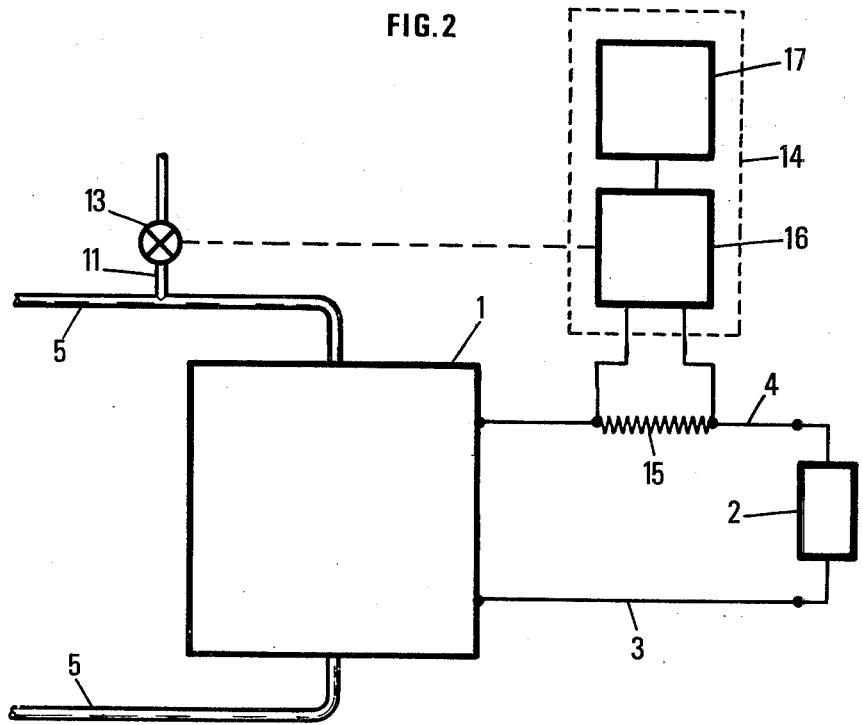
Figure 3:
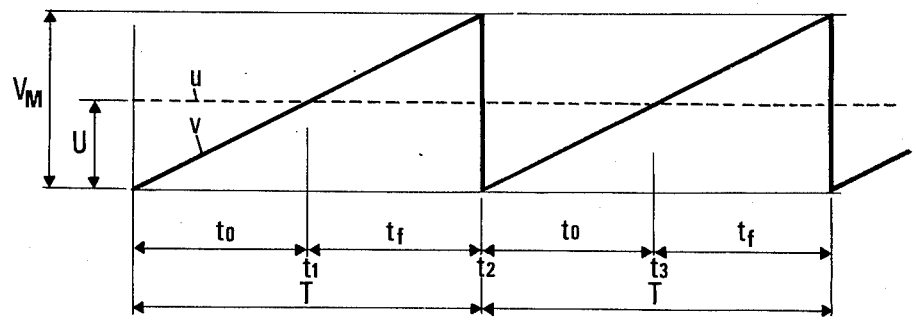

All the advantages of the present invention will be made apparent from the following description illustrated by the accompanying drawings wherein:

FIG. 1 diagrammatically shows a circuit for feeding a fuel cell with a reactant, FIG. 2 diagrammatically shows an embodiment of the element monitoring the valve which controls the discharge of a fraction of the fluid in the feeding circuit, FIG. 3 illustrates the operation of the device of FIG. 4, and FIGS. 4 to 8 illustrate different alternative embodiments of the device according to the invention.

The considered embodiment is devised to feed with a gaseous fluid reactant, such as hydrogen ($H_2$), a fuel cell designated by reference 1. The electric power supplied by the fuel cell is delivered to an output circuit 2 connected to the fuel cell terminals through conductors 3 and 4.

The feeding device comprises a pipe 5 wherethrough hydrogen flows in a closed loop. The hydrogen flow, indicated by the arrows, is produced by a pump 6. Hydrogen enters the fuel cell through an inlet orifice 7 and the unconsumed fluid is discharged from the fuel cell through the outlet orifice 8.

An additional amount of hydrogen is supplied to the feeding circuit through an inlet pipe 9 communicating with the recycling pipe 5.

The pressure P in pipe 5 is kept substantially constant at a predetermined value. This is achieved by means of a pressure regulator of any suitable type which needs not to be described in detail here. In the embodiment illustrated by FIG. 1, this pressure regulator, designated by reference 10, is connected in series with pipe 9, so that the pressure of the hydrogen introduced through pipe 9 is equal to the pressure P to be maintained in pipe 5. In this case the pressure regulator 10 may be a pressure gauge, i.e. it will regulate the hydrogen pressure downstream this regulator, with respect to the direction of hydrogen flow in pipe 9.

A fraction of the fluid flow in pipe 5 is discharged through a discharge pipe 11 which comprises a flow rate regulator diagrammatically shown at 12, to keep at a predetermined constant value the flow rate of the fluid discharged through pipe 11. The fluid flow through this pipe is controlled by intermittent closure means 13, such as a two-way valve having a first position permitting fluid flow through pipe 11, and a second position interrupting this fluid flow.

Valve 13 is actuated by a control element 14 connected to a measuring element or sensor 15 which delivers a signal related to a parameter representative of the operation of the fuel cell.

The control element 14 actuates valve 13, to open or close it in response to the signal delivered by detector 15.

According to a preferred embodiment illustrated by FIGS. 1 and 2, detector 15 delivers a signal representative of the intensity of the electric current I supplied by the fuel cell and the control element 14 is adapted to place the valve in its first position (open position) during a time interval $t_o$, then in a second position (position of closure) during a time interval $t_f$, $t_o$ and $t_f$ being such that their sum $T = t_o + t_f$ is equal to a constant value selected by the user, as will be indicated hereinafter, the ratio $t_o/t_f$ being substantially proportional to the average intensity I of the electric current delivered by the fuel cell during the time interval $t_o + t_f = T$, this average intensity being defined as the ratio of the quantity $q$ of electricity delivered by the fuel cell during the time interval $(t_o + t_f)$ divided by the value $T$ of this time interval.

The operation of the device according to the invention is as follows:

Let be assumed that valve 13 is closed at the initial time $t_1$. The fuel cell 1 is connected to an output circuit 2 and delivers an electric current I under a voltage Y. The flow rate of hydrogen consumed in the fuel cell 1 to produce the electric current I is designated by $q_1$. The pressure P of the fluid in pipe 5 being kept constant, the flow rate $q_e$ of fresh fluid introduced into the loop is:

$$q_e(1 - c_e) = q_1$$

$c_e$ being the concentration of impurities in the fresh fluid introduced into the loop. Since the fuel cell 1 only consumes hydrogen, the average concentration of impurities in the fluid flowing through pipe 5 increases linearly as a function of time, in proportion to the electric current delivered by the fuel cell.

Simultaneously detector 15 delivers to the control element 14 a signal representative of the intensity of the electric current supplied by the fuel cell. The control element 14 generates a control signal placing the valve 13 into its open position at the instant $t_2$ such that $t_2 - t_1 = t_f$.

Consequently a fraction of the fluid flowing through pipe 5 is discharged at a constant flow rate $q_s$ through pipe 11. The fresh fluid being introduced under a constant pressure into pipe 5, the inlet flow rate $q_e$ automatically adjusts itself to comply with the relationship $$q_e = q_s + q_1$$

At the instant $t_3 = t_1 + T = t_1 + t_f + t_o$, the control element 14 closes the valve and the above-indicated cycle is repeated.

It can then be ascertained that the average concentration $c_m$ of impurities in pipe 5 has a substantial constant value, irrespective of the intensity I of the current supplied by the fuel cell.

FIG. 2 diagrammatically illustrates an embodiment of the control element 14 adapted to actuate the element 13 which, in this example, is an electrically-controlled valve, in response to the intensity of current I supplied by the fuel cell to the output circuit 2.

The used detector 15 is a resistor of an accurately known value, connected in series within the electrical circuit of the fuel cell 1.

The electrical voltage $u$ at the terminals of the resistor 15 is proportional to the current intensity I. This voltage is applied to a first input terminal of a comparator-amplifier 16, forming the control element 14. The latter also comprises a generator 17 which delivers a saw-toothed voltage having a maximum amplitude Vm and a period $T = t_o + t_f$.

The voltage $v$ produced by generator 17 is applied to a second input terminal of the comparator-amplifier 16 which generates a signal controlling the electrically actuated valve 13 as hereinabove indicated with reference to FIG. 3.

In FIG. 3 the voltage $v$ developed by generator 17 is shown in solid line. The signal $u$ emanating from sensor 15 is shown in dashed line and, for clarity of the drawing, the amplitude U of this signal has been assumed to be constant and lower than Vm, i.e. the intensity of the electric current delivered by the fuel cell has been assumed to be constant.

Under normal operating conditions, when the difference $u - v$ is positive, the electrically actuated valve is open. When the difference $u - v$ becomes equal to zero (i.e. at the instant $t_1$), the comparator-amplifier 16 delivers a control signal which closes the electrically actuated valve 13 and keeps it closed until the instant $(t_1 + t_f)$ where the comparator amplifier 16 delivers a second control signal which shifts the electrically actuated valve to its open position.

FIG. 3 shows that:
1°/ — if the amplitude U of signal $u$ varies (i.e. if the intensity I delivered by the fuel cell is modified) the time interval $t_o$ varies in the same sense as the value of the intensity I,
2°/ — the sum $t_o + t_f = T$ is constant, and
3°/ — the ratio $t_o/t_f$ is proportional to the intensity of the electric current supplied by the fuel cell 1.

Practically those skilled in the art will select the ratio between the quantity of fluid extracted from the loop and that introduced into the feed loop.

Knowing the intensity of the electric current to be supplied by the fuel cell, it will then be possible to determine the fluid flow rate introduced into the fuel cell 5. Then taking into account the proportion of impurities in the fluid introduced into the pipe, it will be possible to select a value of the time interval $T = t_o + t_f$ which is the shorter as the intensity of the electric current supplied by the fuel cell is higher, and a leakage flow rate which increases with the volume of the feeding circuit, including the volume of the interelectrode space fed by this circuit.

The values of these different parameters may for instance by optimized by testing the operation of the fuel cell under the desired conditions.

By way of example, for a fuel cell having a nominal output of 1 kw, devised to supply electric current having an intensity from 0 to 150 Amperes, the hydrogen feeding circuit has been so designed that the leakage flow rate be equal to about 2% of the flow rate of fresh fluid and the time T equal to about 10 seconds.

Changes may be made in practice in the embodiment illustrated by FIGS. 1 and 2.

For example the pressure regulator 10 may be connected in series with pipe 11, but must then be adapted to keep constant the pressure downstream the regulator. The pressure regulator may also be in series with pipe 5.

It will also be possible to omit the pressure regulator 10 when the fluid feeding pipe 5 is supplied under constant pressure by a suitable fluid source.

The element 12 may be a fixed or adjustable nozzle, but it can be easily omitted if the inner diameter of pipe 11 is given such a value that when the valve 13 is open the leakage flow rate is constant, i.e. the pipe 11 has itself the function of a nozzle.

In the case where element 12 is an adjustable nozzle, it will be possible to use a control element for regulating this nozzle in response to a measured parameter representative of the operation of the fuel cell, such as, for example, the intensity I of the electric current, the output voltage of the fuel cell, the inlet fluid flow rate, etc...

FIGS. 4 to 8 show in part different alternative embodiments of the invention. Throughout these drawings the same reference numerals have been used to designate the same elements.

Figure 4:
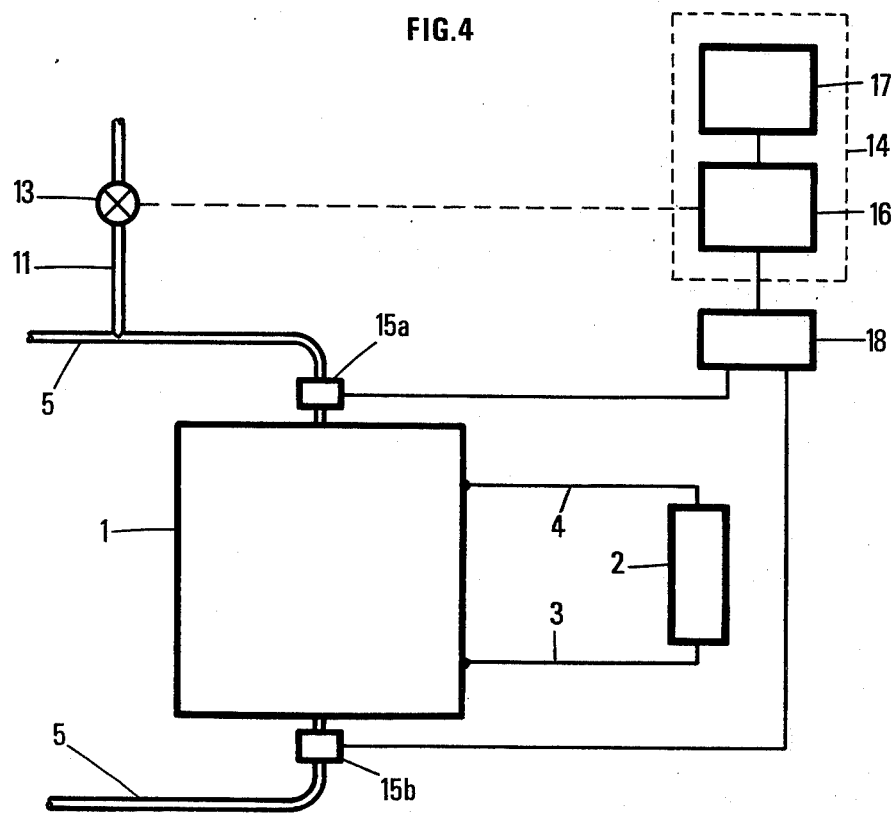

In the embodiment of FIG. 4 the sensing element comprises an element 15a adapted to produce a first signal representing the fluid flow rate into the fuel cell, and an element 15b adapted to produce a second signal representing the fluid flow rate at the outlet of the fuel cell. These elements 15a and 15b may for example be flowmeters of any known type.

The signals delivered by elements 15a and 15b are transmitted to the input terminals of a differential amplifier 18 which, on its output terminals, delivers a signal representative of the difference between the signals applied to the input terminals, i.e. a signal which is dependent on the flow rate of hydrogen consumed in the fuel cell 1.

The signal delivered by the differential amplifier 18 is applied to the inlet of the comparator amplifier 16 of the control element 14 of the electrically actuated valve 13.

Figure 5:
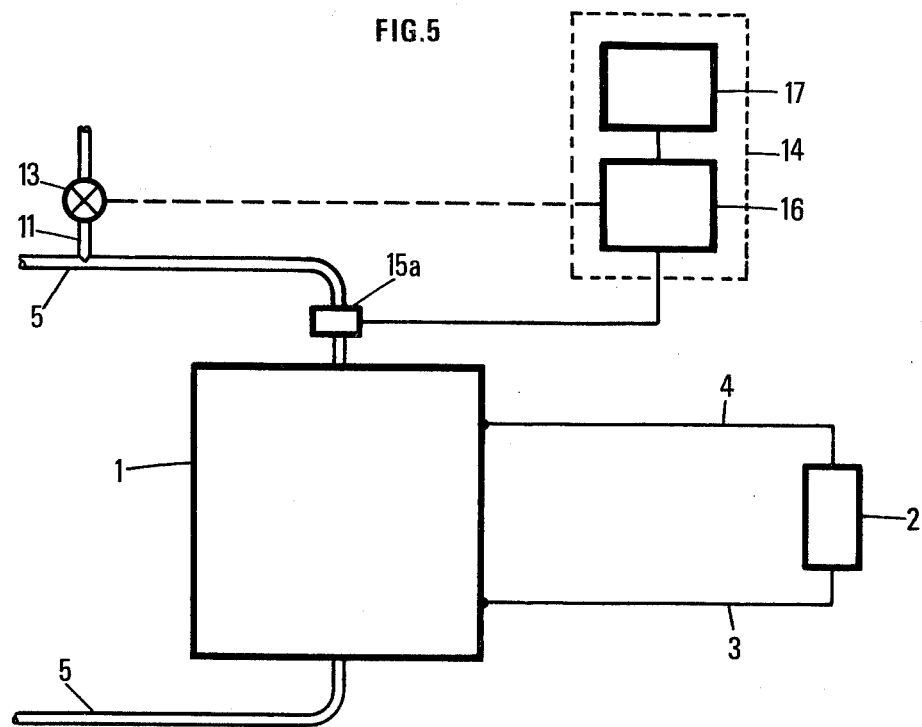

According to the embodiment of FIG. 5, only one element 15 is used to measure the fluid flow rate entering the fuel cell 1. The signal supplied by this element is directly applied to an input terminal of amplifier-comparator 16 of the control element 14 of the electrically actuated valve 13.

It will obviously be possible to place a detecting element of the same type as this element 15a at another location in the feed circuit of the fuel cell, for example at the outlet of the fuel cell or on the pipe feeding hydrogen to pipe 5.

Figure 6:
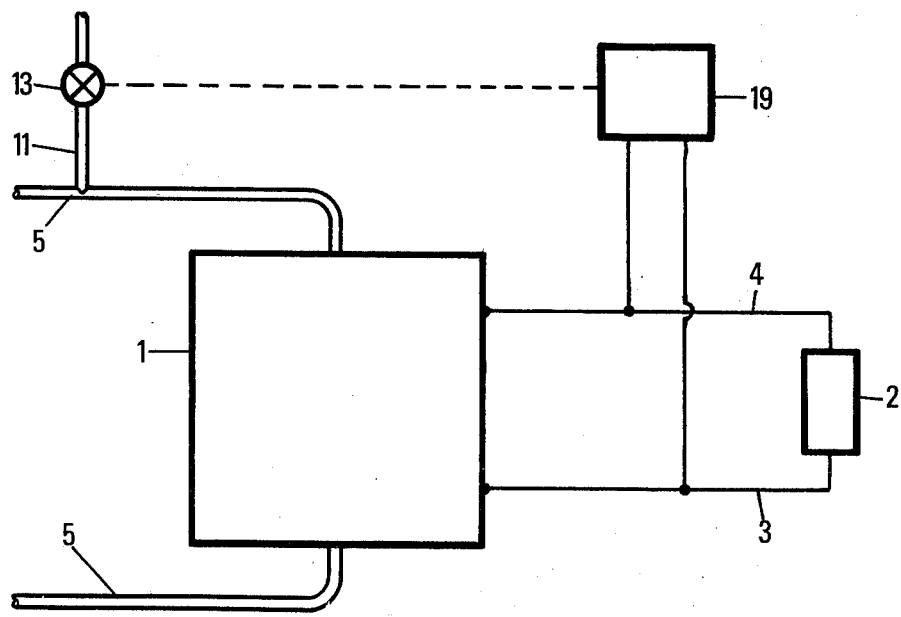

In the alternative embodiment illustrated by FIG. 6, the measured parameter is the electric voltage at the terminals of the fuel cell. This voltage is applied to the input terminal of a pre-adjusted control amplifier 19 which places the electrically actuated valve 13 into its open position when the voltage at the terminals of the fuel cell reaches, while decreasing, a first predetermined adjustable value and places this electrically actuated valve 13 into its close position when the electrical voltage at the terminals of the fuel cell reaches, while increasing, a second predetermined adjustable value.

Figure 7:
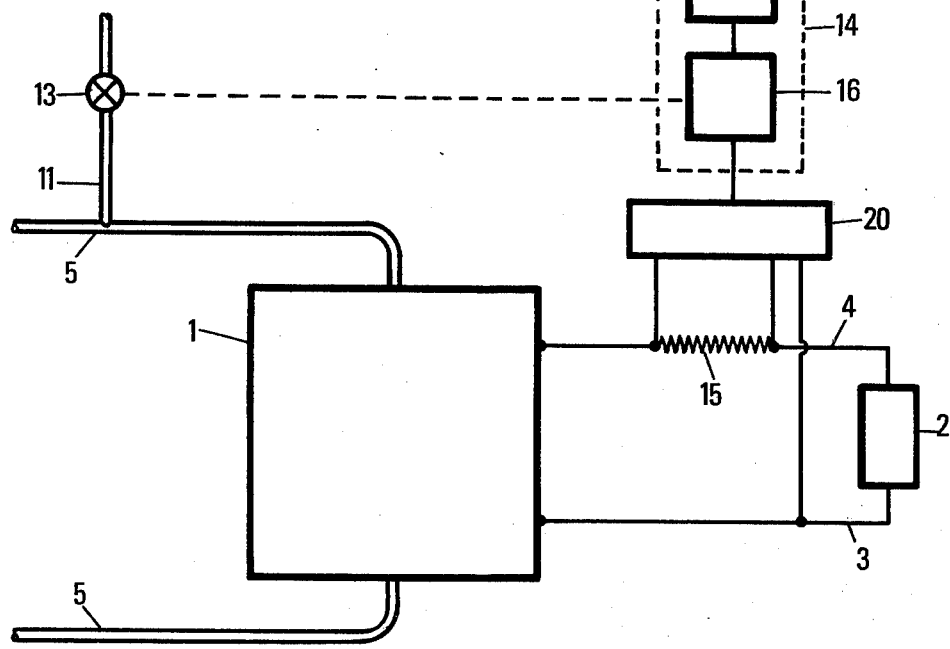

In the embodiment illustrated by FIG. 7, the signal transmitted to the input terminal of the amplifier-comparator 16 is delivered by a correcting amplifier 20. The latter receives on its input terminals a signal representative of the electrical voltage at the terminals of the fuel cell and a signal representative of the electric current supplied by the fuel cell, and delivers a signal which is dependent on the electric power delivered by the fuel cell 1.

Other changes may be made without departing from the scope of the present invention.

Figure 8:
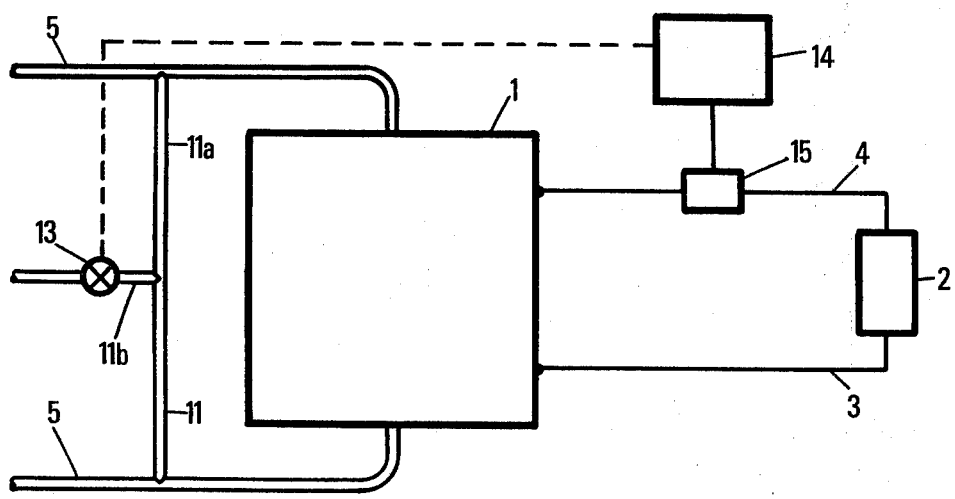

For example, the discharge pipe 11 may be connected to pipe 5 at a point located between the outlet of the fuel cell and the place where fresh hydrogen is introduced, or also between the fuel cell inlet and the place where fresh hydrogen is introduced. It will also be possible to use a pipe 11 which communicates with pipe 5 in two or several points simultaneously, one point being close to the fuel cell inlet and the other close to the fuel cell outlet, as shown in FIG. 8.

The control element 14 may work in dependence with one or several measured parameters representative of the electrical power supplied by the fuel cell 1.

In the above description the device according to the invention has been described in relation with the supply of a gaseous fluid reactant (hydrogen) to the fuel cell. Obviously a similar device may be used for each of the fluid reactants feeding the fuel cell. Moreover the device according to the invention may be used with all fluid reactants, whether they are formed by liquids, gases, gases dissolved in a liquid, or gases in emulsion with a liquid.

The above description relates to the case where the intensity of the electric current delivered by the fuel cell is substantially constant or varies slowly within the time interval T.

When the variations in the current intensity are very rapid and of substantial amplitude, it will be possible to adapt the apparatus by placing between the detector or detectors and the control element of valve 13 a compensator circuit which receives the signals delivered by said detector or detectors and delivers at its output one or several signals representative of the integrated or average value of the received signal or signals, said signal (or signals) being transmitted to the control element of valve 13.

I claim:

1. A method of feeding a fuel cell with at least one fluid reactant, comprising circulating at least one fluid reactant through a closed loop including a fuel cell, introducing a make-up amount of fresh fluid into said loop, keeping at a substantially constant value the fluid pressure within the closed loop during the whole operating period of the fuel cell, automatically discharging, during a discharge period, a fraction of the fluid flowing through the loop and interrupting during a non-discharge period the discharge of said fluid from the loop, said discharge and non-discharge periods repeatedly following one another, wherein the flow rate of said discharged fluid has substantially the same value during all said discharge periods, said value being constant and wherein a time interval between the beginning of two consecutive discharge periods has a predetermined value.

2. A method according to claim 1, comprising measuring at least one parameter representative of the intensity of the electric current delivered by the fuel cell, producing a measuring signal as a function of the value of said parameter, producing a reference signal representative of said time interval between the beginning of two consecutive discharge periods and automatically producing the passage from a discharge period to a non-discharge period when said measuring and reference signals have the same value and the return to a discharge period when said reference signal reaches a predetermined value.

3. A method according to claim 2, wherein said measured parameter is the intensity of electric current supplied by the fuel cell.

4. A method according to claim 2, wherein said measured parameter is the flow rate of the fresh fluid introduced into the closed loop.

5. A method according to claim 2, wherein said measured parameter is the fluid flow rate at the inlet of the fuel cell.

6. A method according to claim 2, wherein said measured parameter is the fluid flow rate at the outlet of the fuel cell.

7. A method according to claim 2, wherein said measured parameter is the difference between the respective flow rates at the inlet and at the outlet of the fuel cell.

8. A method according to claim 1, comprising measuring the value of at least one parameter representative of the operation of the fuel cell and respectively discharging said fraction of the fluid flow in the loop and interrupting said discharge when said parameter reaches successively two predetermined limit-values.

9. A device for feeding a fuel cell with a fluid reactant delivered by a source of said reactant, comprising a recycling pipe having one end connected to a fluid inlet port of the fuel cell and another end connected to an outlet port of the fuel cell, said recycling pipe comprising means for circulating the fluid reactant, a fluid feeding pipe having a first end connected to said recycling pipe and a second end connected to said source of reactant, a discharge pipe having one end connected to said recycling pipe, for discharging a fraction of the fluid contained in said recycling pipe, pressure regulating means maintaining a substantially constant fluid pressure in said recycling pipe, means for intermittently interrupting the fluid flow in said discharge pipe, said interrupting means having a first position wherein the fluid can flow into the discharge pipe and a second position wherein the fluid is prevented from flowing through said discharge pipe out of said recycling pipe, the device comprising control means connected to the interrupting means for repeatedly actuating said interrupting means.

10. A device according to claim 9, wherein a flow regulator is arranged in series on said discharge pipe, said regulator being adapted to maintain a substantially constant fluid flow rate in said discharge pipe when said interrupting means is in said first position.

11. A device according to claim 10, comprising measuring means delivering a measuring signal dependent on a parameter representative of the electric current delivered by the fuel cell.

12. A device according to claim 11, wherein said control means comprise a generator delivering a reference signal of fixed period, a comparator circuit having an input terminal connected to said generator and another input terminal connected to said measuring means, said comparator circuit delivering a first control signal dependent on signals applied on its input terminals so as to shift said interrupting means to said second position, and a second control signal at the end of each period of said reference signal to shift said interrupting means back to said first position.

13. A device according to claim 12, wherein said generator produces a saw tooth signal and said comparator circuit is adapted to produce said first control signal when said reference signal and said measuring signal are equal.

14. A device according to claim 13, wherein said measuring means is constituted by a resistor of an accurately known value connected in series with the electrical circuit of the fuel cell, said measuring signal being the electrical voltage at the input terminals of said resistor.

15. A device according to claim 13, wherein said measuring means is a flowmeter connected in series with said recycling pipe and producing said measuring signal.

16. A device according to claim 15, wherein said flow-meter is located immediately upstream said inlet port of the fuel cell, with respect to the direction of flow of the fluid in said recycling pipe.

17. A device according to claim 15, wherein said flow-meter is located immediately downstream said outlet port of the fuel cell, with respect to the direction of flow of the fluid in said recycling pipe.

18. A device according to claim 13, wherein said measuring means comprises two flowmeters in series with said recycling pipe, a first of said flowmeters being located immediately upstream the inlet port of the pipe and the second immediately downstream the outlet port of the fuel cell with respect to the direction of flow of the fluid in said recycling pipe, and a differential circuit having two input terminals respectively connected to said two flowmeters, said differential circuit generating said measuring signal, of a value equal to the difference in the respective fluid flow rates entering and leaving the fuel cell and being connected to said comparator circuit of said control means.

19. A device according to claim 13, wherein said measuring means is a flowmeter located in series with said inlet pipe.

20. A device according to claim 10, wherein said control means comprises a calibrated circuit having input terminals connected with the terminals of the fuel cell, said calibrated circuit placing said interrupting means in said first position when the electric voltage at the terminals of the fuel cell reaches, while decreasing, a first determined limit-value and placing said interrupting means in said second position when said voltage reaches, while increasing, a second determined limit-value.

21. A device according to claim 10, wherein said flow regulator comprises a nozzle.

22. A device according to claim 21, wherein said nozzle is formed by said discharge pipe.

23. A device according to claim 21, wherein said nozzle is adjustable.

24. A device according to claim 9, wherein said pressure regulating means is connected in series with said inlet pipe and is adapted to maintain a substantially constant fluid pressure downstream an outlet orifice of said pressure regulating means, with respect to the direction of flow of the fluid through said pressure regulating means.

25. A device according to claim 9, wherein said pressure regulating means is connected in series with said discharge pipe and is adapted to maintain a substantially constant fluid pressure upstream an inlet orifice of said pressure regulating means, with respect to the direction of flow of the fluid through said pressure regulating means.

26. A device according to claim 9, wherein said pressure regulating means is connected in series with said recycling pipe and is adapted to maintain a substantially constant pressure throughout said recycling pipe.

* * * * *